United States Patent [19]

Bitsch et al.

[11] 4,353,606

[45] Oct. 12, 1982

[54] MOUNTING FOR A DRIVEN WHEEL

[75] Inventors: Harald Bitsch, Witten; Karl Knaack, Dortmund, both of Fed. Rep. of Germany

[73] Assignee: Mannesmann DeMag A.G., Duisburg, Fed. Rep. of Germany

[21] Appl. No.: 154,776

[22] Filed: May 30, 1980

[30] Foreign Application Priority Data

Jun. 1, 1979 [DE] Fed. Rep. of Germany ....... 2922330

[51] Int. Cl.³ .................... F16C 23/06; F16C 35/06
[52] U.S. Cl. ............................... 308/189 R; 308/236; 308/244; 308/DIG. 11
[58] Field of Search ............... 308/16, 17, 18, 22, 308/178, 189 R, 236, 244, DIG. 11

[56] References Cited

U.S. PATENT DOCUMENTS

| | | | |
|---|---|---|---|
| 2,022,290 | 11/1935 | Large | 308/236 |
| 2,136,155 | 11/1938 | Spicacci | 308/236 |
| 2,564,670 | 8/1951 | Bratt | 308/236 |
| 2,817,142 | 12/1957 | Boden et al. | 308/236 |
| 3,510,184 | 5/1970 | Gruber et al. | 308/189 |
| 3,749,463 | 7/1973 | Krapf | 308/236 |
| 4,124,078 | 11/1978 | van der Lely et al. | 308/178 |

FOREIGN PATENT DOCUMENTS

| | | |
|---|---|---|
| 811021 | 8/1951 | Fed. Rep. of Germany . |
| 1246964 | 8/1967 | Fed. Rep. of Germany . |
| 1456445 | 5/1969 | Fed. Rep. of Germany . |
| 1957252 | 6/1971 | Fed. Rep. of Germany . |
| 2034107 | 1/1972 | Fed. Rep. of Germany . |
| 1506505 | 4/1973 | Fed. Rep. of Germany . |
| 2521540 | 11/1976 | Fed. Rep. of Germany . |
| 2645489 | 4/1978 | Fed. Rep. of Germany . |
| 1220247 | 5/1960 | France . |

OTHER PUBLICATIONS

Journal "German Hoisting and Conveying Technique", 1966, p. 77.
"The Hoisting Appliances", by H. Ernst, 1973.
SKF Pamphlet "Installation and Removal of Ball Bearings", p. 16.

*Primary Examiner*—Richard R. Stearns
*Attorney, Agent, or Firm*—Mandeville and Schweitzer

[57] ABSTRACT

The invention relates to the mounting of a driven wheel having a shaft on antifriction bearings, and spring rings retaining the latter, in bushings of a crane.

10 Claims, 2 Drawing Figures

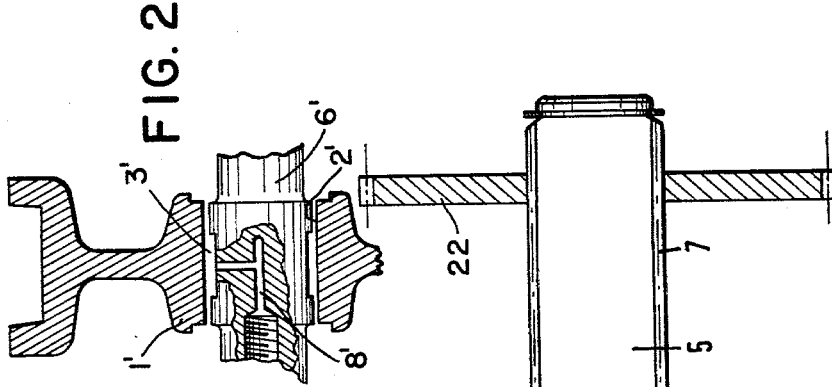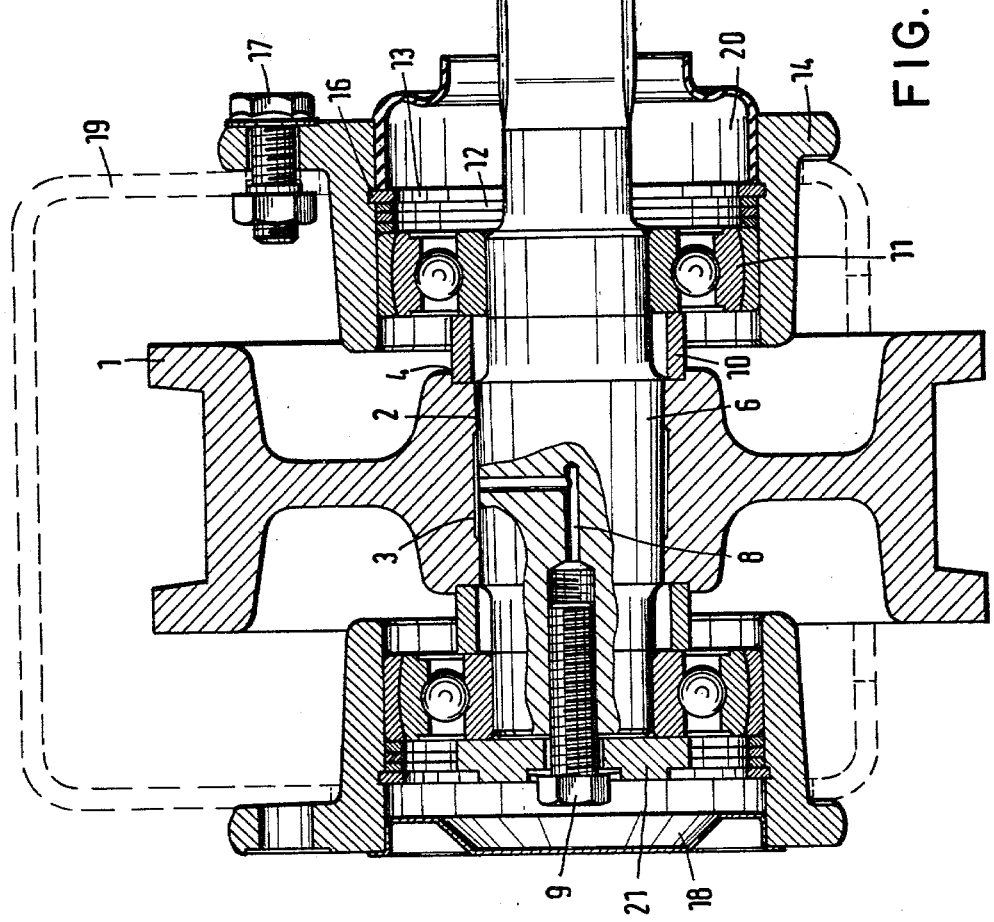

MOUNTING FOR A DRIVEN WHEEL

BACKGROUND AND SUMMARY OF THE INVENTION

The mounting disclosed in DE-AS No. 1 506 505 shows the driven wheel being joined irrotationally to the shaft via a serration. The serration must transfer torques and wheel pressures and is thus subject to alternating stress conditions. As the distance between the rails of the crane track may differ in factory buildings, the crane track must be adjustable. The serration mentioned must be manufactured very precisely to make such track adjustment possible, and this is expensive. Also known are adapter springs, but they are not a complete solution, taking into consideration the reversing torque. Crane wheels are often subject to extraordinary wear at the bearing surfaces and rims and must, therefore, be easily replaced. If the shaft which is not exposed to wear and tear, is not to be replaced when changing a wheel, the wheel must be easily detachable from the shaft. For this reason, a permanent, i.e., nondetachable contraction joint between wheel and shaft is not recommended either.

It is the object of the invention to form the mounting of a crane wheel so that the wheel is easily replaced and the distances between spaced rails on which the wheels ride may be adjusted, while still guaranteeing a perfect power transmitting and non-rotational connection between shaft and wheel. The safe transmittal of horizontal forces is also an object of this invention. This is done by attaching the wheel to the shaft by means of an oil pressure band and by arranging spacer discs between the antifriction bearings and the spring rings. The oil pressure band may be removed at any time by removing oil pressure to the connecting surfaces so that the wheel may be easily separated from the shaft. When altering the track, some of the spacer discs are removed from one side of the wheel and added on the other side without having to totally remove the driven wheel by fully releasing the oil pressure from the oil pressure band. If the two bushings of a wheel are further apart than the width of the wheel, due to the great width of the beam in which they are attached, the invention provides spacer rings which are located between the wheel and the roller bearings. These are made of light metal and may project into annular or ring shaped grooves of the wheel and are, therefore, retained during assembly. Using light metal has the advantage that it will not lead to corrosion (seizing) between the spacer ring and the steel of the wheel or the roller bearing. The spacer rings also transfer axial forces.

In further developments of the invention, the end of the shaft opposite the wheel, is provided with a multi-wedge serration or teeth for a sliding yet tightly engaging fit with the teeth of a driving gear located on the drive shaft of a motor.

An oil duct passes through the shaft starting at the end of the shaft opposite the teeth, i.e., the multi-wedge serration and ending in a shaft cavity in the area of the wheel center. Oil is pressed through this oil duct during assembly and disassembly of the wheel to expand the wheel bore hole. An oil screw is inserted into the outer end of the oil duct to provide the oil press.

To facilitate assembly and disassembly, the shaft is furthermore in the shape of a truncated cone tapered toward the end of the shaft opposite the end provided with the multi-wedge serrations or teeth, and the bore hole of the wheel matches this. The pitch of the truncated cone and bore hole amounts to about 1:10 to 1:50. A pressure set screw may be threaded into the bore hole of the wheel to ensure the pressing of a wheel safety plate against the wheel to thereby retain the wheel on the shaft if the pitch of the cone is steep. The bore hole of the wheel may have a recess in the center area in order to provide a perfect fit between wheel and shaft. Such a recess may, of course, also be present on the shaft in the central area of the wheel. The recess may have a depth of about 1 mm. In order to prevent compression of the edges when the two bushings of a wheel bearing are not properly aligned, the antifriction bearings may have a rocking suspension.

BRIEF DESCRIPTION OF THE DRAWINGS

FIG. 1 is a cross sectional view of the invention; and

FIG. 2 is a partial cross sectional view of an alternate embodiment of the invention.

DESCRIPTION OF THE INVENTION

Wheel 1 is provided with bore hole 2 matching truncated cone 6 of shaft 5 and in the central area there is recess 3 for proper mounting of wheel 1 with the edge of bore hole 2 on shaft 5. For the supply of oil pressure, shaft 5 has oil duct 8 coming from the front and reaching halfway up truncated cone 6, ending there in the cavity of the truncated cone. Pressure screw 9 with wheel safety plate 21 safeguards wheel 1 against axial displacement on shaft 5. The latter has, at the end opposite oil duct 8, multi-wedge serration 7 for connection to a driving gear 22.

Shaft 5 is supported on both sides of the wheel via antifriction bearings 11 in bushings 14. The latter are attached in overhead beam 19, shown in broken lines by means of screws 17. Wheel 1 has ring grooves 4 on both sides next to bore hole 2 for spacer rings 10, holding wheel 1 and shaft 5 in axial direction in overhead beam 19. The two bushings 14 are provided outside antifriction bearings 11 with ring grooves 16 for spring rings 13. Between spring rings 13 and antifriction bearings 11 there are, on both sides, several spacer discs in the form of annular thin spacer ring members 12 which may be interchanged when adjusting the track of the crane to match the wheel with this changed track. Cap 18 is inserted into bushing 14 on the left to protect antifriction bearing 11 against soiling. Antifriction bearing 11 on the right is protected by membrane 20 adhering closely to the gear which is not shown here.

FIG. 2 is a partial cross sectional view of an alternate embodiment of the present invention. As can be there seen, the recess 3' is now cut into the exterior surface of the cone or shaft 6' with the inside bore hole 2' of the wheel 1' being a smooth surface. This embodiment of the present invention operates substantially similarly to the operation of the invention as shown in FIG. 1.

We claim:

1. A wheel support for an overhead crane comprising:
   (a) a shaft having a wheel carrying curved surface;
   (b) anti-friction bearings, said shaft being rotatably supported by said bearings;
   (c) bushings for supporting said bearings;
   (d) an oil duct extending into said shaft, said oil duct exiting said shaft at said curved surface of said shaft;

(e) a wheel having a central bore hole, a portion of the central bore hole of said wheel overlying said curved surface of said shaft where said oil duct exits from said shaft;
(f) an oil pressure providing means for supplying oil, under pressure, to said oil duct and to said portion of the central bore hole of said wheel;
(g) said bushings being provided with selectively secured positioning means; and
(h) selected spacer ring members are provided between said positioning means and said bearings for adjustably positioning said bearings with respect to said bushings.

2. A wheel support as claimed in claim 1, wherein:
(a) said portion of said central bore hole of said wheel is a cylindrical recess.

3. A wheel support as claimed in claim 1, wherein:
(a) a portion of said curved surface of said shaft is provided with a cylindrical recess; and
(b) said portion of the central bore of said wheel overlying said cylindrical recess.

4. A wheel support as claimed in claim 1, wherein:
(a) said oil pressure providing means is a pressure providing screw; and
(b) said screw being adjustably threaded into one end of said shaft.

5. A wheel support as claimed in claim 1, wherein:
(a) said bushings are provided with annular grooves;
(b) said positioning means are spring-type retaining rings received within said grooves; and
(c) said spacer ring members are positioned between said retaining rings and said bearings.

6. A wheel support as claimed in claim 5, wherein:
(a) spacer rings are provided between said wheel and said bearings.

7. A wheel support as claimed in claim 6, wherein:
(a) said spacer rings are received within annular grooves of said wheel.

8. A wheel support as claimed in claim 1, wherein said shaft is provided with a multi-wedge serration at the end of said shaft opposite said wheel, said serration securing a driving gear for said shaft.

9. A wheel support as claimed in claim 1, wherein said shaft is tapered as a truncated cone and said bore hole matches the taper of said shaft.

10. A wheel support as claimed in claim 9, wherein said taper amounts to about 2 to 10%.

* * * * *